United States Patent
Yoon (10) Patent No.: US 7,917,162 B2
(45) Date of Patent: Mar. 29, 2011

(54) MOBILE TERMINAL AND METHOD FOR MANAGING MESSAGE THEREOF

(75) Inventor: Sung-Woo Yoon, Seoul (KR)

(73) Assignee: LG Electronics Inc., Seoul (KR)

( * ) Notice: Subject to any disclaimer, the term of this patent is extended or adjusted under 35 U.S.C. 154(b) by 744 days.

(21) Appl. No.: 11/870,117

(22) Filed: Oct. 10, 2007

(65) Prior Publication Data

US 2008/0096534 A1    Apr. 24, 2008

(30) Foreign Application Priority Data

Oct. 19, 2006    (KR) .................. 10-2006-0102028

(51) Int. Cl.
*H04W 4/00*    (2009.01)
*H04M 3/42*    (2006.01)
*H04B 1/38*    (2006.01)

(52) U.S. Cl. ............... 455/466; 455/414.2; 455/566

(58) Field of Classification Search .......... 455/466, 455/412.1, 414.1, 412.2, 418–420, 566, 517–518, 455/515; 348/14.02, 14.08
See application file for complete search history.

(56) References Cited

U.S. PATENT DOCUMENTS

| | | | |
|---|---|---|---|
| 7,050,836 B2 * | 5/2006 | Paakkonen | 455/567 |
| 7,389,117 B2 * | 6/2008 | Lovell, Jr. | 455/466 |
| 7,619,584 B2 * | 11/2009 | Wolf | 345/1.2 |
| 7,627,311 B2 * | 12/2009 | Oijer | 455/415 |
| 2001/0021649 A1 * | 9/2001 | Kinnunen et al. | 455/412 |
| 2003/0236769 A1 * | 12/2003 | Pyhalammi | 707/1 |
| 2005/0075895 A1 * | 4/2005 | Mohsenin et al. | 705/1 |
| 2005/0221802 A1 * | 10/2005 | Hosono | 455/412.1 |
| 2005/0240484 A1 * | 10/2005 | Yan et al. | 705/26 |
| 2006/0248154 A1 * | 11/2006 | Chu et al. | 709/206 |
| 2007/0054679 A1 * | 3/2007 | Cho et al. | 455/466 |
| 2007/0206231 A1 * | 9/2007 | Singh | 358/302 |
| 2007/0296739 A1 * | 12/2007 | Lonn | 345/634 |

* cited by examiner

*Primary Examiner* — George Eng
*Assistant Examiner* — Brandon J Miller
(74) *Attorney, Agent, or Firm* — Birch, Stewart, Kolasch & Birch, LLP (57) ABSTRACT

A mobile terminal and method of managing a reply message are discussed. According to an embodiment, the terminal includes a storage unit that stores information regarding a multimedia message with an image file attached thereto, when the multimedia message is transmitted; and a controller that controls the storage unit such that when a return message to the transmitted multimedia message is received, the return message is registered in the storage unit as a reply associated with the image file, and when the image file is reproduced, the associated reply is reproduced together with the image file.

19 Claims, 8 Drawing Sheets

MOBILE TERMINAL AND METHOD FOR MANAGING MESSAGE THEREOF

This application claims the priority benefit of Korean Patent Application No. 10-2006-0102028, filed on Oct. 19, 2006, which is hereby incorporated by reference as if fully set forth herein.

BACKGROUND OF THE INVENTION

1. Field of the Invention

The present invention relates to a mobile terminal for registering a reply (i.e., comment, text message, etc.) with respect to an image file and its message management method.

2. Description of the Related Art

A multimedia messaging system (MMS) provides a service of transmitting various types of data such as still images, e.g., photos, music, voice and video, etc., via a wired/wireless network. The MMS supports transmission/reception of huge amounts of data as well as provides a message transmission/reception function provided by an existing system such as a voice messaging system (VMS)/a unified (integrated) messaging system (UMS), etc.

A MMS subscriber may read or transmit diverse messages including a multimedia element such as video news or video mail, etc., as well as an e-mail, facsimile, or a voice message, regardless of types of terminals any time and anywhere.

SUMMARY OF THE INVENTION

Therefore, in order to address the above matters the various features described herein have been conceived. One aspect of the exemplary embodiments of the present invention is to provide a mobile terminal for registering a message as a reply with respect to an image file such as a phone or video and managing the same, and its message management method.

The foregoing and other objects, features, aspects and advantages of the present invention will become more apparent from the following detailed description of the present invention when taken in conjunction with the accompanying drawings.

BRIEF DESCRIPTION OF THE DRAWINGS

The accompanying drawings, which are included to provide a further understanding of the invention and are incorporated in and constitute a part of this specification, illustrate embodiments of the invention and together with the description serve to explain the principles of the invention.

In the drawings.

DETAILED DESCRIPTION OF THE PREFERRED EMBODIMENTS

A mobile terminal according to the exemplary embodiments of the present invention includes a memory unit that stores identification information of an image file and time and date information of a multimedia message, when the multimedia message including the image file is transmitted; and a controller that controls the component(s) of the mobile terminal such that when a return message with respect to the transmitted multimedia message is received, the return message is registered as a reply with respect to the transmitted image file, and when the image file is reproduced, the return message registered as the reply is also displayed together with the image file. Accordingly, the present invention provides a method and device for managing reply messages received from at least one other device n response to a sent message.

With such a structure, when the mobile terminal reproduces the image file such as a photo or video attached to the multimedia message, it can display the return message, as a reply, related to the image file, so a user may be more interested beyond a simple album function that allows only storing and reproducing of an image.

Examples of the mobile terminal described in the present invention may include, but are not limited to, a mobile phone, a smart phone, a notebook computer, a digital broadcast terminal, a PDA (Personal Digital Assistant), a PMP (Portable Multimedia Player), navigation, etc.

The exemplary embodiments of the present invention will now be described with reference to the accompanying drawings.

Figure 1:
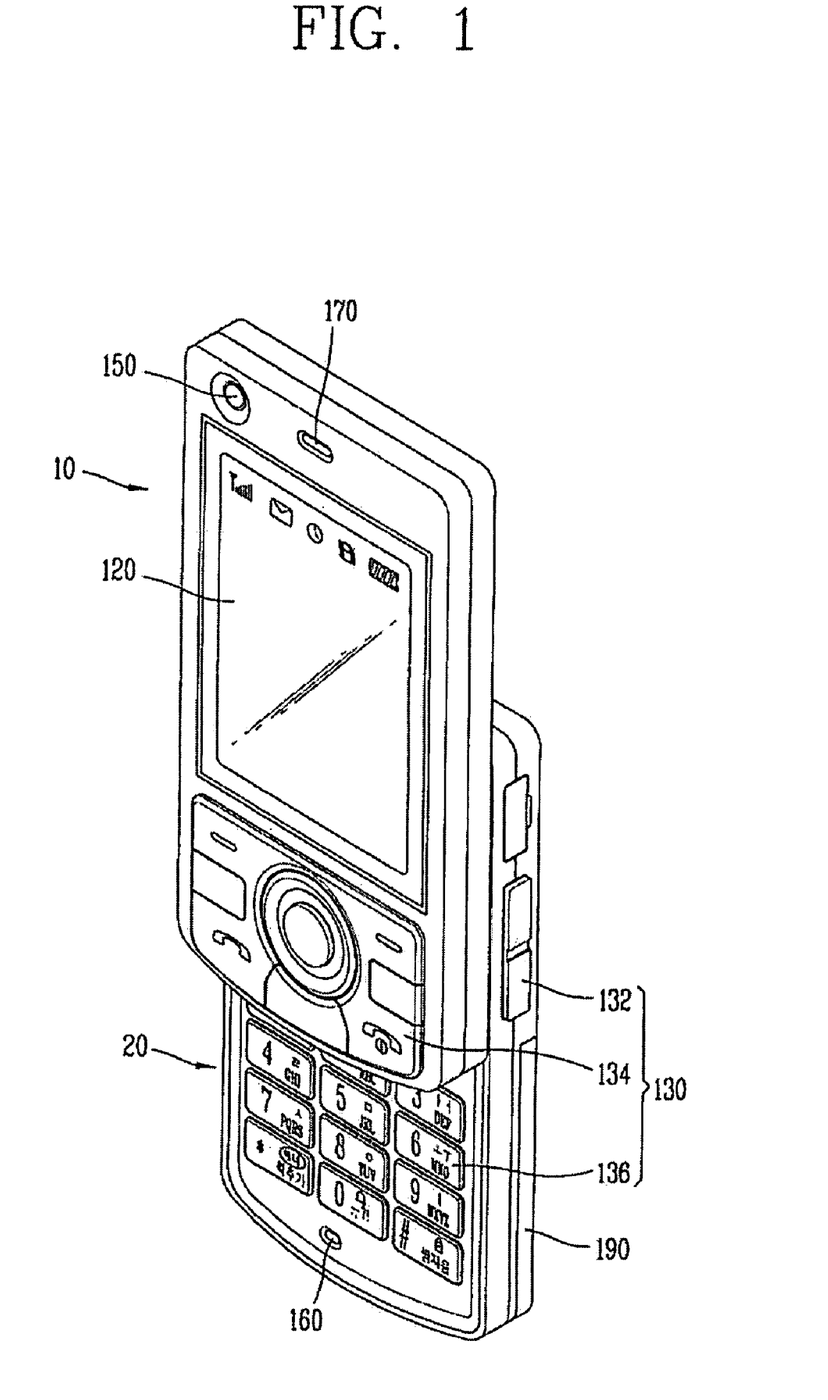
FIG. 1 is a front perspective view of a mobile terminal according to one exemplary embodiment of the present invention.

FIG. 1 is a front perspective view of a mobile terminal according to one exemplary embodiment of the present invention. In the present invention, a slide type mobile terminal will be taken as an example. However, the present invention is applicable to other types of mobile terminals such as bar type mobile terminals, folder type mobile terminals, etc.

As shown in FIG. 1, the mobile terminal according to the present invention includes a first body 10 and a second body 20 that is formed to be slidable along in at least one direction with respect to the first body 10.

The first body 10 may include a display unit 120, a second input part 134, an image input 150, and an audio output unit 170.

The display unit 120 may be implemented as an LCD (Liquid Crystal Display) or an OLED (Organic Light Emitting Diode), etc., that visually displays information. The OLED is commonly used for a display of a small device such as a digital camera. The display unit 120 may be implemented in the form of a touch screen by being combined with a touch panel that senses a touch and outputs corresponding position information with respect to the touched point. Thus, the display unit 120 may be used not only as an input unit but also as the display unit.

The second input part 134 is a function key including one or more keys that receive an execution command of functions such as call start and end, cancel menu, or power, etc.

The image input unit 150 serves to obtain an image through an image sensor and convert it into an electrical signal. As the image sensor, a CCD (Charge-Coupled Device) or a CMOS (Complementary Metal Oxide Semiconductor) image sensor or the like may be used.

The audio output unit 170 is positioned at an upper end portion of the first body 10 and outputs voice and audio signals to the exterior. The audio output unit 170 may be implemented in the form of a receiver or speaker.

The second body 20 may include a first input part 132, a third input part 136, an audio input unit 160 and a power supply unit 190.

The first input part 132 is a hot key which is attached at the side of the mobile terminal and is used to simply execute applications such as a camera or an MP3 (MPEG Audio Layer-3 Player), etc.

The third input part 136 is preferably a keypad for receiving numbers, characters and symbols, etc.

The first to third input parts 132, 134 and 136 may be generally called an input unit 130 and can be manipulated through an operation such as pressing or touching by the user. The input unit 130 may be implemented in the touch of a touch pad, a touch screen or a dome switch, etc. or also may be implemented in the form of a wheel or a jog stick.

The audio input unit 160, which receives a voice of the user or a sound generated from outside, may be implemented as a microphone.

The power supply unit 190 includes a battery for supplying power to the mobile terminal, which can be detachably combined with the mobile terminal.

The mobile terminal can further include other known components, and all the components of the mobile terminal are operatively coupled and configured.

Figure 2:
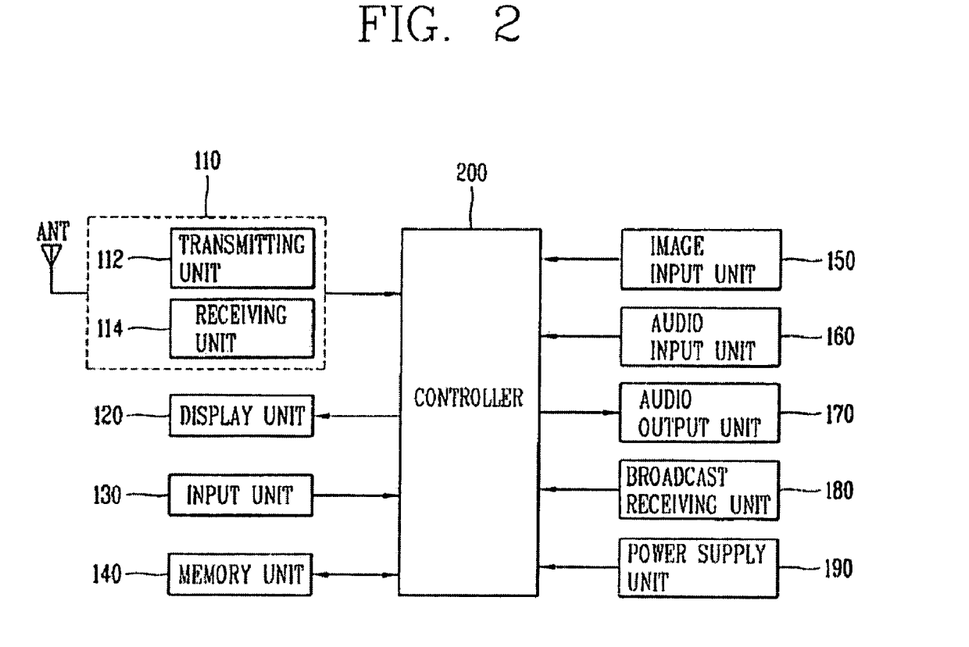
FIG. 2 is a schematic block diagram showing the mobile terminal according to one exemplary embodiment of the present invention.

FIG. 2 is a schematic block diagram showing the components of the mobile terminal of FIG. 1 according to one exemplary embodiment of the present invention.

As shown in FIG. 2, the mobile terminal according to the present invention includes a wireless communication unit 110, the display unit 120, the input unit 130, a memory unit 140, the image input unit 150, the audio input unit 160, the audio output unit 170, a broadcast receiving unit 180, the power supply unit 190, and a controller 200, etc.

The wireless communication unit 110 transmits and receives a radio signal including data such as a voice, an image text, etc., and/or a control signal through an antenna ANT. The wireless communication unit 110 includes a transmitting unit 112 that transits the radio signal through the antenna ANT and a receiving unit 114 that demodulates a radio signal received through the antenna ANT. The transmitting unit 112 and the receiving unit 114 can be separate entities or can be integrated into one entity. When the radio signal is received from a base station, the receiving unit 114 converts the radio signal into a baseband frequency for its processing by the controller 200.

In the present invention, the wireless communication unit 110 transmits and receives a multimedia message and receives a return message with respect to the multimedia message.

The display unit 120 displays various information in the form of, e.g., a still image, video, animation, text, etc., and a state and result according to an operation of the mobile terminal. In addition, the input unit 130 can be implemented in the form of the touch screen so as to serve not only as an input unit but also as the display means.

The input unit 130 generates an electrical signal according to a user manipulation and transfers it to the controller 200. The input unit 130 preferably includes the keypad 136, the function keys 134 allocated to perform certain functions, and the hot key(s) 132 for easily performing execution of one or more certain applications. The input unit 130 may also include any other means to input data to the mobile terminal. The user may input instruction information such as a phone number or various function execution commands by pressing or touching the input unit 130.

The memory unit (or storage unit) 140 stores general program(s) required for operating the mobile terminal and various data generated as the operation of the mobile terminal is performed. The memory unit 140 can include one or more of the following: a flash memory, an SD (Secure Digital) memory, a RAM (Random Access Memory), a ROM (Read Only Memory), and a hard disk, etc. In addition, the memory unit 140 stores at least one image file such as a photo or video, at least one data file for managing replies, a multimedia message, and a return message. That is, the memory unit 140 stores one or more data files, each for managing and storing one or more replies received from other device(s) in response to a sent message.

Figure 3:
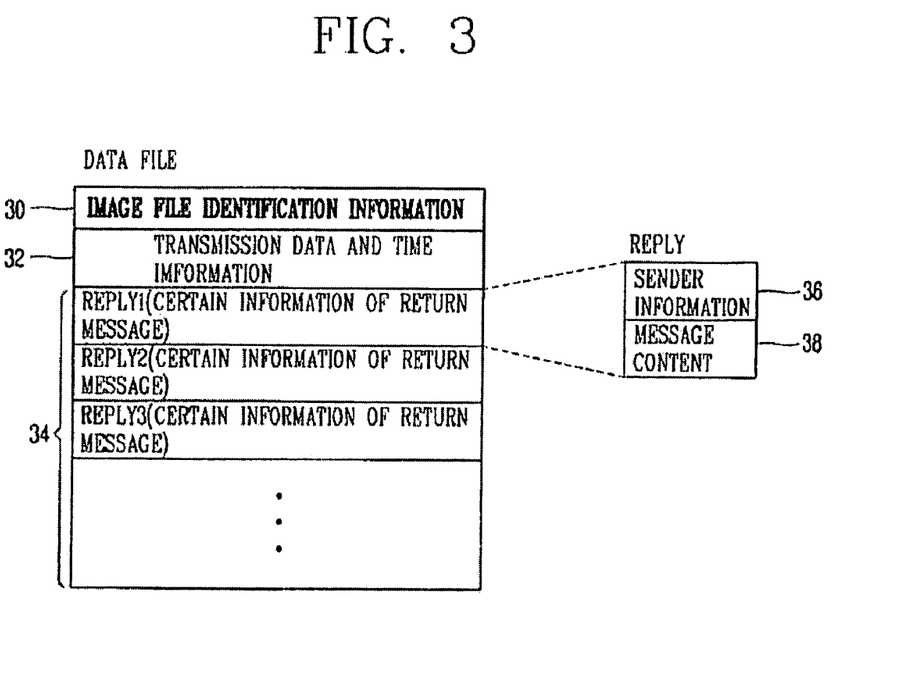
FIG. 3 is a view showing an example of a data file for managing replies in the mobile terminal according to the exemplary embodiment of the present invention.

FIG. 3 shows an example of such a data file according to an embodiment of the present invention. In the example of FIG. 3, the mobile terminal transmits a multimedia message with an image file attached thereto to other communication device(s), and receives one or more reply messages in response to the transmitted multimedia message from the other communication device(s).

As shown in FIG. 3, the data file for managing replies may include identification information 30 of the image file attached to the multimedia message, information 32 about transmission date and time at which the multimedia message was transmitted (e.g., information about a date and time at which the image file was transmitted), and reply information 34 related to the reply registered to the image file, etc. The identification information may be one of a file index, a file name and a file path of the image file. Here, the file name is uniquely given in a system within the terminal. For example, the file name of a still image such as a photo may be given in the form of P_0001.jpg, P_0002.jpg., P_0003.jpg, etc., and the file name of video may be given in the form of V_0001.aiv, V_0002.avi, and V_0003.avi, etc.

The reply information 34 is information related to the return message(s) with respect to the previously transmitted multimedia message, and can include caller identification information (reply sender information) 36 and message content (content of reply message) 38. In other words, the return message is used as a reply with respect to the image file attached to the previously transmitted multimedia message. In this way, the mobile terminal stores return/reply messages received in response to its sent message, in association with the sent message, for effective management thereof.

The image input unit 150 serves to obtain an image from the exterior through the image sensor and convert it into an electrical signal. The image input unit 150 may store the obtained image in the memory unit 140 or transmit it through the wireless communication unit 110 under the control of the controller 200.

The audio input unit 160 receives an audio signal such as a voice and a sound from the exterior and converts it into an electrical signal. In case of call communication, the converted signal is outputted to the wireless communication unit 110, and in case of recording, the converted signal is outputted to the memory unit 140.

The audio output unit 170 converts the voice and audio data received from the wireless communication unit 110 or the voice and audio data stored in the memory unit 140 into an audible frequency and outputs it to the exterior.

The broadcast receiving unit 180 receives broadcast-related information such as a broadcast signal (e.g., digital multimedia broadcasting signal) and/or an electric program guide (EPG) transmitted from a broadcast station. The broadcast signal received through the broadcast receiving unit 180 is processed and then outputted to the display unit 120 and/or the audio output unit 170.

The power supply unit 190 receives external or internal power (e.g., a battery) and supplies power required for operating each element of the mobile terminal under the control of the controller 200.

Generally, the controller 200 controls a general operation of the mobile terminal. The controller 200 transfers a multimedia message of the mobile terminal to a destination (e.g., another device), or detects various data or instruction information from a return message received from a different user and stores it in the memory unit 140. The controller 200 receives data or a conditional request inputted through the input unit 130, reads message history data corresponding to the conditional request and displays it on the display unit 120.

The controller 200 processes radio signals received through the wireless communication unit 110 and outputs the processed radio signals. For example, when the radio signal is a termination call, the controller 200 may transform it into audible and readable information that can be outputted through the audio output unit 170.

In addition, when a return message with respect to a transmitted multimedia message is received, the controller 200 displays a user interface (UI) on the display unit 120 in order to check whether the user wants to register the return message as a reply. When the user selects a reply registration menu through the UI displayed on the display unit 120, the controller 200 displays a list of particular images stored in the memory 140 on the display unit 120. The particular images refer to the image files which were transmitted as attachments to the multimedia message when multimedia messages were transmitted. When the particular images are displayed, the controller 200 controls such that the particular images are displayed on the display unit 120 in the form of a list or thumbnails. For example, the list of the particular images can be aligned (or arranged) in the order of the most recently transmitted images and be displayed.

When one of the displayed particular images is selected, the controller 200 stores certain information of the return message together with the information regarding the corresponding image file in the memory unit 140. In other words, the controller 200 registers the return message as a reply with respect to the selected image file. And when the image file is reproduced, the controller 200 controls such that the certain information of the return message corresponding to the reproduced image file is displayed as a reply.

In addition, because the multimedia message and the return message share the identification information of the image file attached to the multimedia message, the controller 200 may perform an automatic reply function. Thus, when the return message with respect to the multimedia message is received, the controller 200 searches the multimedia message related to the received return message among the previously transmitted multimedia messages, and searches an image file attached to the searched multimedia message. This is because, when the mobile terminal, which has received the multimedia message, transmits the return message, it includes identification information of the image file included in the received multimedia message and transmits it, so the controller 200 searches the image file corresponding to the return message by using the identification information.

Figure 4:
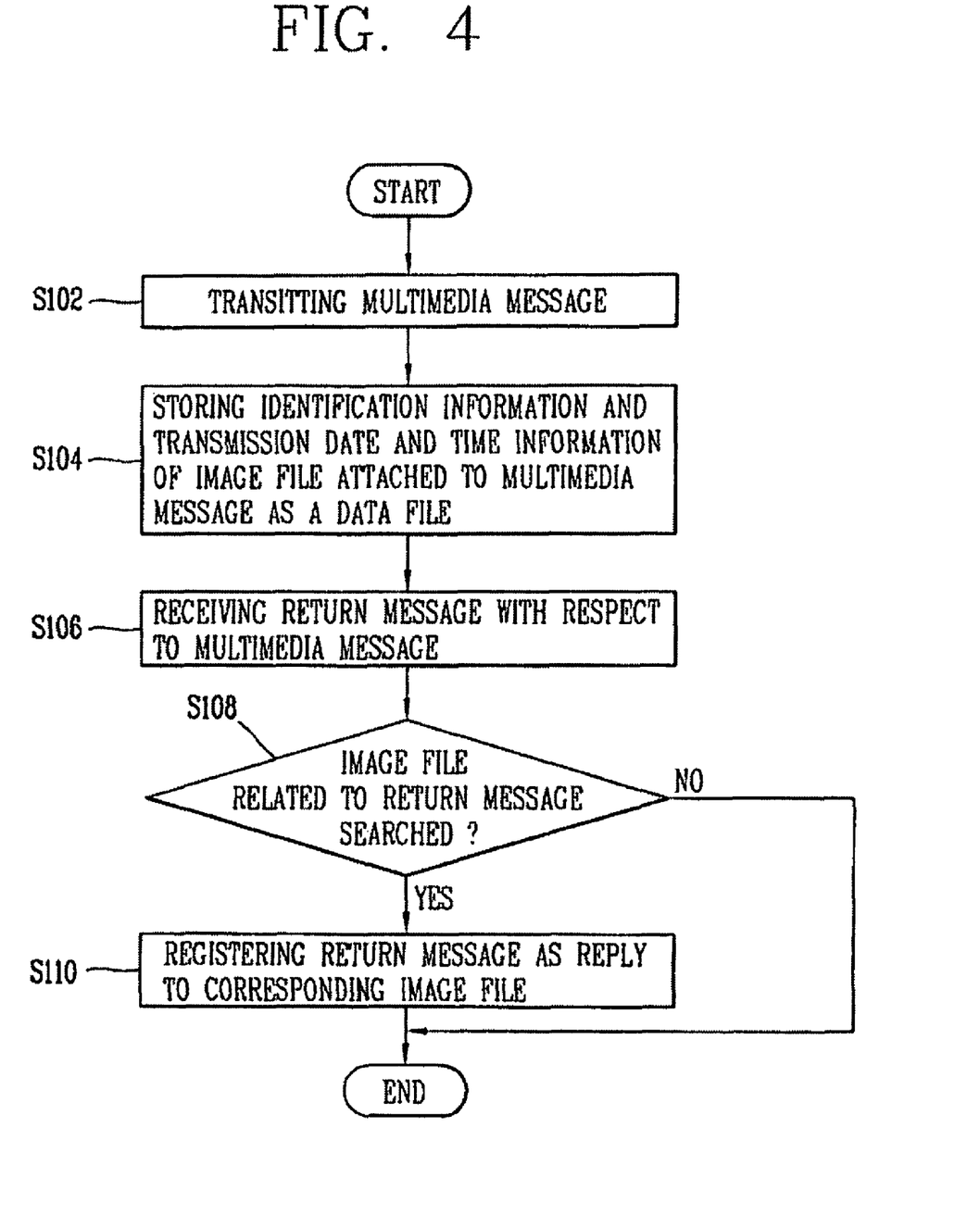
FIG. 4 is a flow chart illustrating the processes of a method for managing a message of the mobile terminal according to the exemplary embodiment of the present invention.

FIG. 4 is a flow chart illustrating the processes of a method for managing a message of the mobile terminal according to the exemplary embodiment of the present invention. In this exemplary embodiment, when the mobile terminal receives a return message with respect to a previously transmitted message, it automatically registers the return message as a reply with respect to an image file related to the multimedia message. The image file can include a picture, text, an image, etc. Also transmission of a multimedia message is discussed, but this is only an example, and other types of message transmission are part of the invention. The method of FIG. 4 is implemented in the device of FIGS. 1 and 2 using the data structure of FIG. 3, but can be implemented in other suitable device using other suitable data structure.

With reference to FIG. 4, the mobile terminal adds a particular image file, such as a photo, video, or other, to a multimedia message according to an instruction from a user of the mobile terminal, and transmits the multimedia message to different user(s) (e.g., at different devices) through the wireless communication unit 110 (S102). In this case, the user of the mobile terminal may attach an image file previously stored in the memory unit 140 to the multimedia message. Besides, a music file, a data file or contents may be attached to the multimedia message.

After the multimedia message is transmitted, the controller 200 of the mobile terminal stores information regarding the transmitted multimedia message in the form of a data file in the memory unit 140 (S104). The information regarding the multimedia message includes identification information 30 for identifying the image file attached to the multimedia message, and time and data information 32 as to when the multimedia message was transmitted. For instance, the controller 200 may store the data file as shown in FIG. 3 for the transmitted multimedia message.

The identification information 30 is uniquely assigned to the image file attached to the multimedia message, which may use one of a file index, a file name and file paths. Here, the file name is uniquely set by a system within the mobile terminal.

The data file includes certain information 34 of the return message(s) in addition to the information regarding the multimedia message, and is used to manage the return message(s) registered as a reply (or replies) with respect to the image file attached to the multimedia message. Namely, the data file is used to register reply messages in association with the image file included in the sent multimedia message. With reference to FIG. 3, the data file may include e image file identification information 30 attached to the multimedia message, multimedia message transmission date and time information 32, and reply information 34. Here, the reply information is related to the return message received through the wireless communication unit 110 and preferably includes sender information 36, such as a phone number or the name, for identifying a sender who has transmitted the return message and message content 38 of the return message which may include feelings and impressions (comments) of the sender with respect to the image file.

Thereafter, when the return message (e.g., a short message) with respect to the transmitted multimedia message is received from another device (e.g., device B) by the wireless communication unit 110 of the mobile terminal, the controller 200 of the mobile terminal searches the image file related to the received return message among image files stored in the memory unit 140 (S106, S108). In transmitting the return message by the device B, the device B adds the identification information of the image file attached to the received multimedia message to its return message and transmits it to the mobile terminal. Accordingly, the controller 200 checks whether any identification information stored in the data file and the identification information included in the received return message are the same, so as to associate the received return message to the correct multimedia message and its image file.

Upon searching in step S208, when there is an image file related to the return message, the controller 200 registers the return message as a reply with respect to the located image file and stores relevant information in the data file (S110). In this case, the controller 200 searches information about a user of a phone number identical to the phone number of the sender of the return message. The controller 200 stores the searched information (e.g., the caller name and icon) in the data file where the identification information of the image file is stored. In addition, text of the return message is also stored in the data file in which the information regarding the image file has been recorded. When there is no phone number identical to the phone number of the sender, the sender information of the return message is stored as 'anonymous' or replaced with the phone number of the sender.

Figure 5:
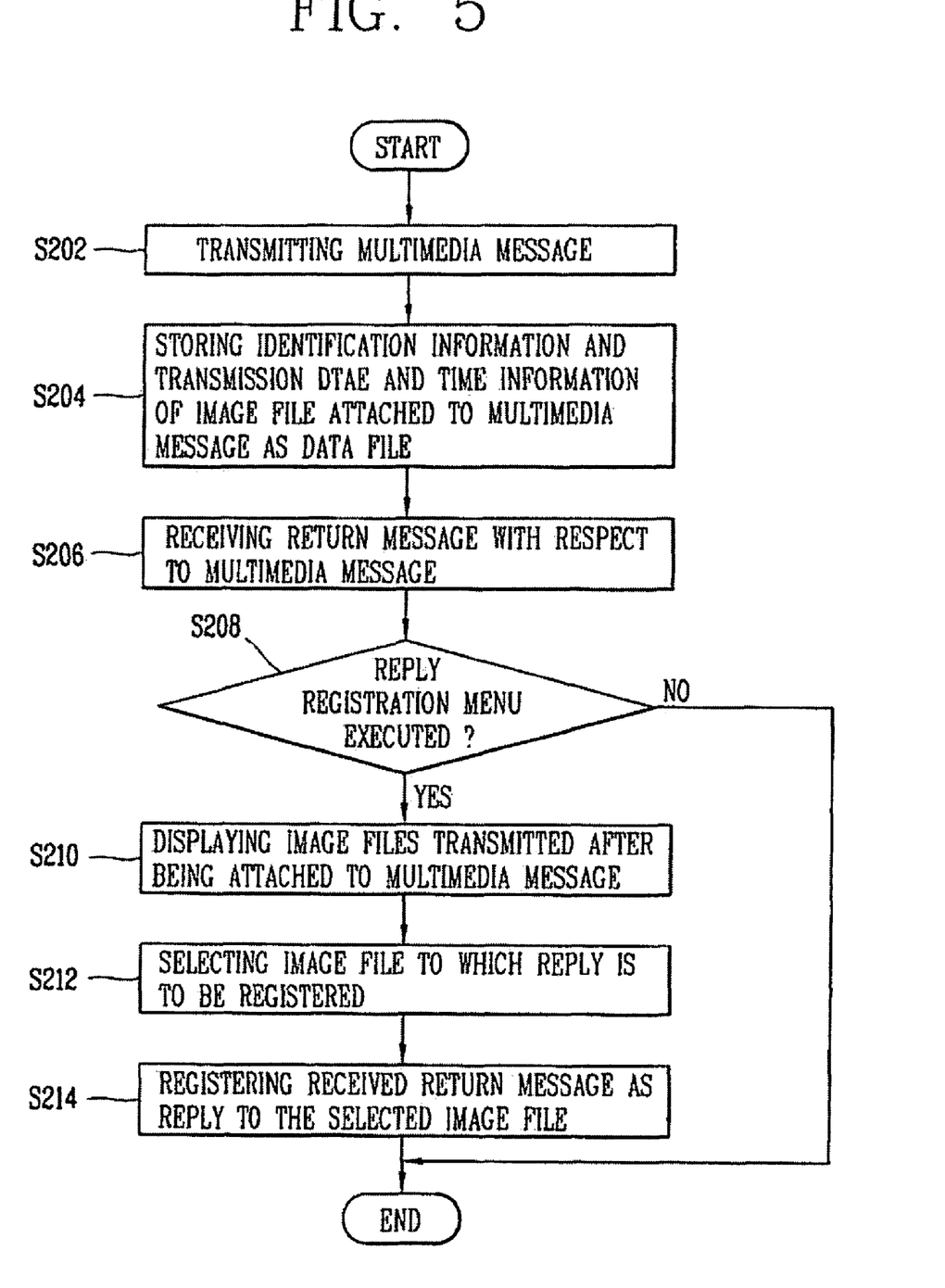
FIG. 5 is a flow chart illustrating the processes of a method for managing a message of a mobile terminal according to another exemplary embodiment of the present invention.

FIG. 5 is a flow chart illustrating the processes of a method for managing a message of a mobile terminal according to another exemplary embodiment of the present invention. In this exemplary embodiment of the present invention, when a return message with respect to a previously transmitted multimedia message is received from another device, the return message is registered as a reply according to user manipulation of a menu. The method of FIG. 5 is implemented in the device of FIGS. 1 and 2 using the data structure of FIG. 3, but can be implemented in other suitable device using other suitable data structure.

With reference to FIG. 5, the controller 200 of the mobile terminal attaches a particular image file such as a photo or video stored in the memory unit 140 and transmits it to different users/devices according to an instruction of a user of the mobile terminal (S202). After the multimedia message is transmitted to the different users/devices, the controller 200 of the mobile terminal stores the information on the multimedia message, for example, the identification information of the image file attached to the multimedia message, transmission date and time information in the form of a data file, as discussed above, in the memory unit 140 (S204).

Thereafter, when a return message from the other device with respect to the multimedia message is received, the controller 200 displays a message informing about the reception of the return message and/or content of the return message on the display unit 120 (S206). In this case, the controller 200 may output an alert sound (notification sound) and/or makes vibration to allow the user of the mobile terminal to recognize the reception of the return message.

Subsequently, the user of the mobile terminal checks the return message displayed on the display unit 120, and when he/she wants to register the return message as a reply, the user of the mobile terminal selects a reply registration menu through the menu manipulation (S208). According to the user selection of the reply registration menu, the controller 200 reads image files which have been attached to the multimedia message and transmitted from the memory unit 140, and displays them on the display unit 120 (S210). In this case, the controller 200 displays the list of the image files in the order of the most recently transmitted image files with reference to the transmission time and date information stored in the data files.

Then, the user selects an image file to which the return message is to be registered as a reply from the list of the image files displayed on the display unit 120 (S212). The controller 200 registers the received return message as a reply with respect to the selected image file (S214).

At this time, the controller 200 searches a phone number identical to a phone number of the sender of the return message from a phone book and stores user information (e.g., the name of the sender) corresponding to the searched phone number in the data file where the identification information of the image file is stored. In addition, the controller 200 also stores the content of the return message in the data file. Meanwhile, if there is no same phone number, the name of the sender of the return message as 'anonymous' is stored or is stored instead of the phone number of the sender.

Figure 6:
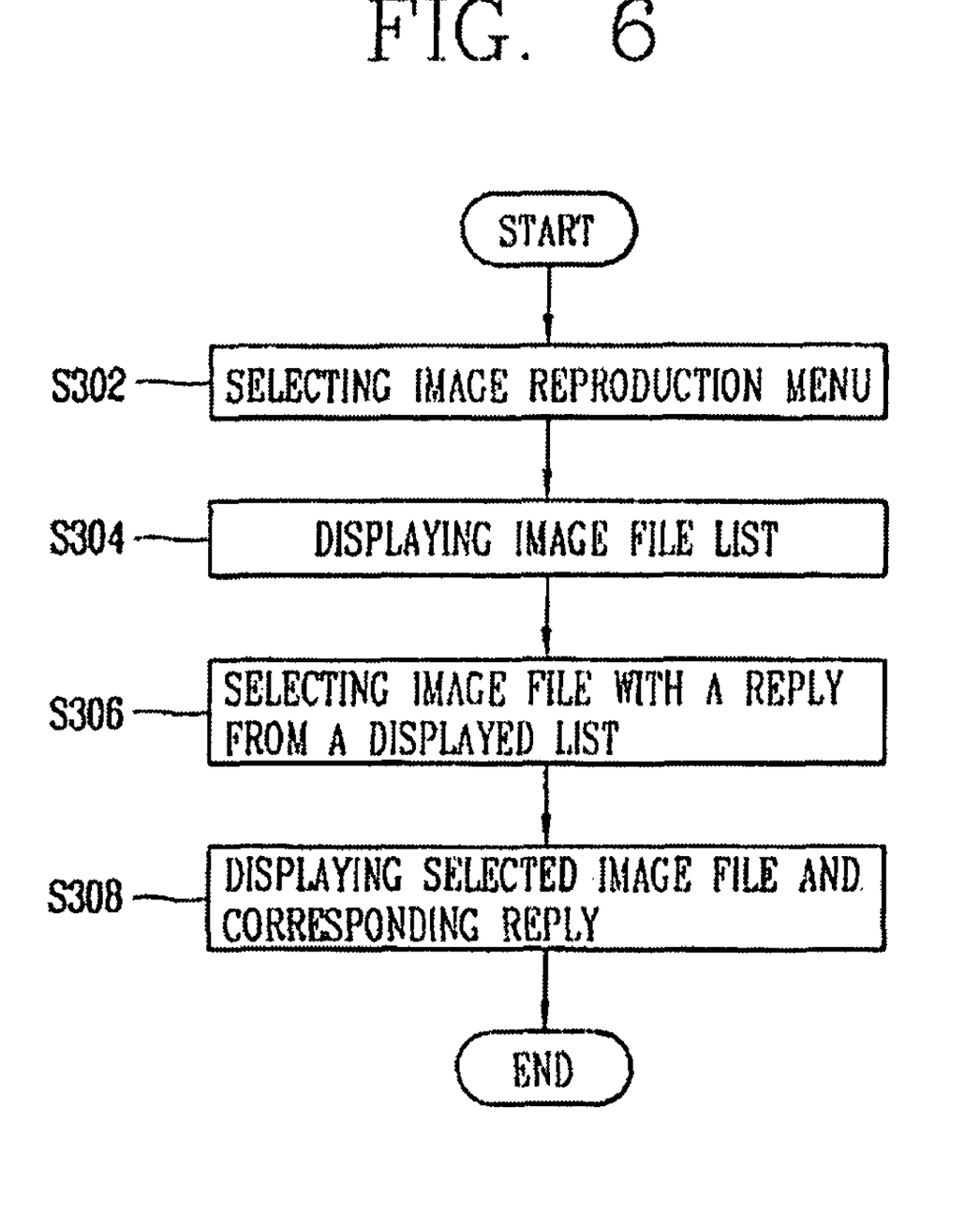
FIG. 6 is a flow chart illustrating the processes of a method for reproducing a multimedia file in the mobile terminal according to an exemplary embodiment of the present invention.

FIG. 6 is a flow chart illustrating the processes of a method for reproducing a multimedia file in the mobile terminal according to an exemplary embodiment of the present invention. The method of FIG. 6 is implemented in the device of FIGS. 1 and 2 using the data structure of FIG. 3, but can be implemented in other suitable device using other suitable data structure. This exemplary embodiment of the present invention will be described with reference to FIGS. 7A and 7B.

Figure 7A:
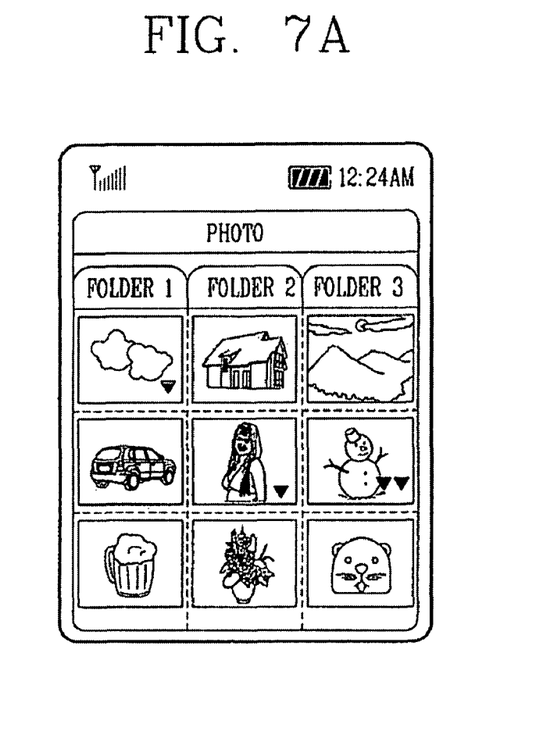
FIGS. 7A and 7B are views showing examples of screen images displaying a list of image files in the mobile terminal according to the exemplary embodiment of the present invention.
Figure 7B:
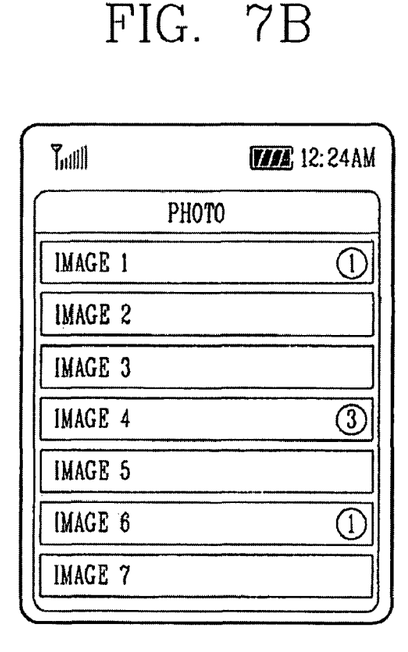

With reference to FIG. 6, when the user selects an image file reproduction menu by manipulating the input unit 130 (S302), the controller 200 displays a list of the image files stored in the memory unit 140 on the display unit 120 (S304). The list of the image files can be displayed in the form of thumbnails as shown in FIG. 7A or in the form of a list as shown in FIG. 7B. In this case, as shown in FIG. 7A, the controller 200 may display whether or not there is a reply (or replies) corresponding to the image file in the form of a symbol, an image, an icon or the like, or as shown in FIG. 7B, the controller 200 may display the number of replies corresponding to the image file as a number. In addition, the controller 200 may output indicators such as symbols, images, icons or the like by the number that identifies the number of replies corresponding to the image file.

When one image file with a reply is selected fro the list of the image files displayed on the display unit 120 (S306), the controller 200 displays an image such as a photo or video stored in the selected image file and, at the same time, displays the reply (replies) registered to the corresponding image file on the display unit 120 (S308). The reply (replies) may be displayed in various forms at any position, e.g., at upper/lower or left/right portion, of the displayed image.

The display form of the reply in reproducing the image file will now be described in more detail according to an embodiment of the present invention. In these examples, the reply information can be displayed at various locations (e.g., at the lower or upper portion of the screen image and/or in various forms (e.g., as balloons, as windows, etc.).

Figure 7C:
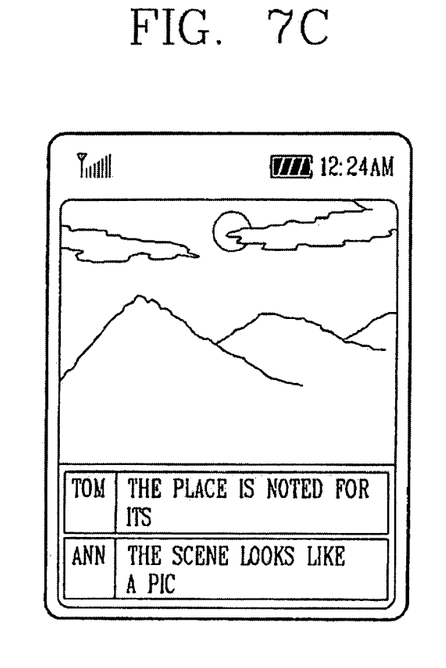
FIGS. 7C to 7F are views showing examples of screen images displaying replies in the mobile terminal according to the exemplary embodiment of the present invention.
Figure 7D:
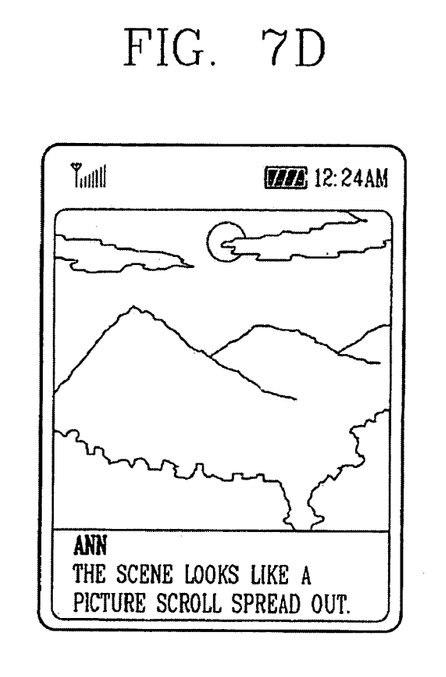

As shown in FIG. 7C, the reply (replies) may be displayed in the form of a list at a lower end portion of the reproduced image. In this case, information on each sender who has sent the return message with respect to the previously transmitted multimedia message and a portion of the message content of the return message are displayed at the lower end portion of the reproduced image. When one on the list of the replies is selected, the selected reply is displayed in an opened format as shown in FIG. 7D. For example, when the reply with respect to 'ANN' is selected from the list of the replies as shown in FIG. 7C, the entire content of the selected reply (i.e., the content of 'ANN' reply message) as shown in FIG. 7D is displayed on the display unit 120.

Figure 7E:
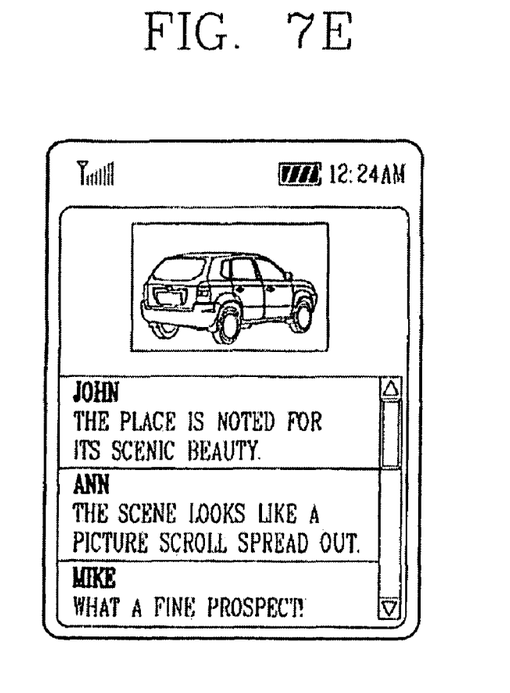

Alternatively, as shown in FIG. 7E, all the replies registered to the image file can be displayed in the form of being unfolded at the lower end portion of the image. In this case, the image file may be displayed in the form of a thumbnail. As a variation, just the names of the senders of the received replies may be displayed. If the user selects a particular sender's name, then the content of the selected sender's reply message may be displayed.

Figure 7F:
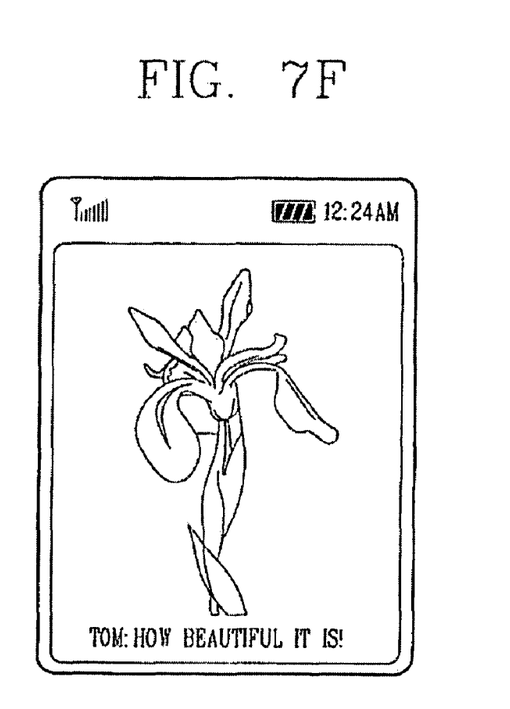

Alternatively, as shown in FIG. 7F, the replies registered to the image file can be displayed to overlap with an image displayed on the display unit 120. For example, in the present invention, the content of the reply (replies) may be displayed in the form of subtitles on a reproduced image or may be displayed to be shifted in a certain direction.

Besides, in a state that the selected image file is displayed on the display unit 120, the reply (replies) may be, displayed according to a user's menu manipulation. In other words, the reply can be displayed according to the user selection, the reply may be displayed only when the user wants, and when the user does not want it, the natural (original) image reproducing function may be possibly performed.

As so far described, in the present invention, the reply function is implemented for the multimedia messaging service of the mobile terminal, so that the user can record and store thoughts, feelings, or other comments on multimedia message recipients with respect to images (photographs or video) which were transmitted as being included in the multimedia messages. Because the thoughts and feelings of different users are stored, the user may feel more interested in the multimedia message operation compared with the simple album function of the related art mobile terminal that stores only images (photographs or video). In particular, rather than that the image file attached to the multimedia message and the return message are separately kept in each different repository and retrieved separately when the user wants to see them, in the present invention, the multimedia message and its corresponding return message share the identification information of the image file attached to the multimedia message, so that when the image file attached to the multimedia message is reproduced, the related return message is displayed together with the image file as a reply for the user's convenience and enhanced experience.

As the present invention may be embodied in several forms without departing from the spirit or essential characteristics thereof, it should also be understood that the above-described embodiments are not limited by any of the details of the foregoing description, unless otherwise specified, but rather should be construed broadly within its spirit and scope as defined in the appended claims, and therefore all changes and modifications that fall within the metes and bounds of the claims, or equivalents of such metes and bounds are therefore intended to be embraced by the appended claims.

What is claimed is:

1. A method for managing a message of a mobile terminal, comprising:
   transmitting a multimedia message having an image file therein;
   storing information related to the multimedia message; and
   selectively registering a return message with respect to the multimedia message as a reply with respect to the image file, wherein the registering step includes
      displaying image files attached to the transmitted multimedia message;
      selecting one of the displayed image files; and
      registering the return message as a reply with respect to the selected image file.

2. The method of claim 1, wherein the information related to the multimedia message comprises identification information of the image file, and transmission date and time information of the multimedia message.

3. The method of claim 2, wherein the identification information is one of a file index, a file name, and a file path of the image file.

4. The method of claim 3, wherein the file name is uniquely assigned in a system within the mobile terminal.

5. The method of claim 1, wherein the return message comprises content of the return message, and sender information related to a sender of the return message.

6. The method of claim 5, wherein the return message includes identification information identifying the image file included in the transmitted multimedia message.

7. The method of claim 1, wherein the registering step comprises:
   searching for an image file corresponding to the return message among a plurality of image files; and
   registering the return message as the reply with respect to the searched image file.

8. The method of claim 1, wherein, in the displaying the attached image files, the image files are displayed as a list or in the form of thumbnails on a screen of the mobile terminal.

9. A mobile terminal comprising:
   a storage unit that stores information regarding a multimedia message with an image file attached thereto, when the multimedia message is transmitted; and
   a controller that controls the storage unit such that when a return message to the transmitted multimedia message is received, the return message is registered in the storage unit as a reply associated with the image file, and when the image file is reproduced, the associated reply is reproduced together with the image file,
   wherein when the image file to which the reply is to be registered is selected, the controller registers the return message as the reply with respect to the selected image file.

10. The terminal of claim 9, wherein the information regarding the multimedia message comprises identification information of the image file, and transmission date and time information of the multimedia message.

11. The terminal of claim 10, wherein the identification information is at least one of an index, a file name, and a file path of the image file.

12. The terminal of claim 9, wherein the return message comprises message content of the return message, and sender information associated with a sender of the return message.

13. The terminal of claim 10, wherein the return message comprises the same identification information of the image file attached to the multimedia message.

14. The terminal of claim 9, wherein the controller stores the information regarding the multimedia message and one or more replies in association with each other in a single data file in the storage unit.

15. A method for managing a message of a mobile terminal, comprising:
   transmitting a multimedia message including an image file;
   storing information related to the multimedia message;
   receiving a return message with respect to the transmitted multimedia message;
   searching for an image file corresponding to the return message among a plurality of image files, wherein stored identification information of the image file included in the transmitted multimedia message is compared with identification information included in the return message; and
   registering the return message as the reply with respect to the searched image file.

16. A method for managing a message of a mobile terminal, comprising:

transmitting a multimedia message including an image file;

storing information related to the multimedia message;

selectively registering a return message with respect to the multimedia message as a reply with respect to the image;

displaying a list of image files when the mobile terminal enters a file reproduction mode;

selecting one of the image files on the displayed list; and     displaying the selected image file and at least a part of one or more corresponding replies on a screen of the mobile terminal.

17. The method of claim 16, wherein, in the displaying the list of the image files, whether or not there is a reply corresponding to the image file is indicated by one of a symbol, an image and an icon.

18. The method of claim 16, wherein, in the displaying the list of the image files, the number of replies corresponding to each image file is indicated by a number, or by one of symbols, images and icons corresponding to the number of replies.

19. A mobile terminal comprising:

a storage unit configured to store information regarding a multimedia message including an image file, when the multimedia message is transmitted; and     a controller configured to register a return message to the transmitted multimedia message in the storage unit as a reply associated with the image file once the return message is received, to reproduce the associated reply together with the image file when the image file is reproduced, to search for the image file related to the return message based on identification information of the image file, and to register the return message as the reply with respect to the searched image file,     wherein the information regarding the multimedia message includes the identification information of the image file and transmission date and time information of the multimedia message, and the return message includes the same identification information of the image file attached to the multimedia message.

\* \* \* \* \*